(12) United States Patent
Shen et al.

(10) Patent No.: US 9,319,605 B2
(45) Date of Patent: Apr. 19, 2016

(54) INCREASING DYNAMIC RANGE USING MULTISAMPLING

(71) Applicant: Rambus Inc., Sunnyvale, CA (US)

(72) Inventors: Jie Shen, Fremont, CA (US); Song Xue, San Jose, CA (US); Maxim Smirnov, Wilsonville, OR (US)

(73) Assignee: Rambus Inc., Sunnyvale, CA (US)

( * ) Notice: Subject to any disclaimer, the term of this patent is extended or adjusted under 35 U.S.C. 154(b) by 40 days.

(21) Appl. No.: 13/842,760

(22) Filed: Mar. 15, 2013

(65) Prior Publication Data

US 2014/0267884 A1    Sep. 18, 2014

(51) Int. Cl.
    *H04N 5/353*  (2011.01)
    *H04N 5/235*  (2006.01)
    *H04N 5/232*  (2006.01)
    *H04N 5/355*  (2011.01)
    *H04N 5/376*  (2011.01)

(52) U.S. Cl.
    CPC ............ *H04N 5/3535* (2013.01); *H04N 5/2353* (2013.01); *H04N 5/2327* (2013.01); *H04N 5/35581* (2013.01); *H04N 5/3765* (2013.01)

(58) Field of Classification Search
    None
    See application file for complete search history.

(56) References Cited

U.S. PATENT DOCUMENTS

| | | | |
|---|---|---|---|
| 6,175,383 B1 | 1/2001 | Yadid-Pecht et al. | |
| 6,580,454 B1 | 6/2003 | Perner et al. | |
| 7,948,537 B2 | 5/2011 | Chou | |
| 7,973,846 B2 | 7/2011 | Reyneri et al. | |
| 8,094,211 B2 | 1/2012 | Kwon et al. | |
| 8,125,545 B2 | 2/2012 | Hablutzel | |
| 8,134,624 B2 | 3/2012 | Solhusvik et al. | |
| 2002/0027606 A1* | 3/2002 | Yadid-Pecht | 348/298 |
| 2006/0109373 A1 | 5/2006 | Kurane | |
| 2006/0238632 A1 | 10/2006 | Shah | |
| 2008/0094486 A1* | 4/2008 | Fuh et al. | 348/229.1 |
| 2008/0192132 A1* | 8/2008 | Bechtel et al. | 348/294 |
| 2009/0160987 A1* | 6/2009 | Bechtel et al. | 348/302 |
| 2009/0190015 A1* | 7/2009 | Bechtel et al. | 348/302 |
| 2009/0256938 A1* | 10/2009 | Bechtel et al. | 348/302 |
| 2009/0268083 A1 | 10/2009 | Arishima et al. | |
| 2010/0039542 A1 | 2/2010 | Shah | |
| 2010/0187407 A1* | 7/2010 | Bechtel et al. | 250/214 R |
| 2010/0188540 A1* | 7/2010 | Bechtel et al. | 348/302 |
| 2011/0069189 A1 | 3/2011 | Venkataraman et al. | |
| 2012/0001060 A1* | 1/2012 | He | 250/214 P |
| 2012/0086840 A1* | 4/2012 | Xhakoni et al. | 348/297 |
| 2012/0281111 A1* | 11/2012 | Jo et al. | 348/229.1 |
| 2013/0208157 A1* | 8/2013 | Bechtel et al. | 348/297 |

OTHER PUBLICATIONS

Acosta-Serafini, Pablo M., "Predictive Multiple Sampling Algorithm with Overlapping Integration Intervals for Linear Wide Dynamic Range Integrating Image Sensors," Massachusetts Institute of Technology, Feb. 2004. 173 pages.

(Continued)

*Primary Examiner* — Justin P Misleh
(74) *Attorney, Agent, or Firm* — Fenwick & West LLP

(57) ABSTRACT

Methods and systems for increasing the effective dynamic range of an image sensor are disclosed. Each pixel in the sensor is exposed for a respective first exposure time. Each pixel's response to the respective first exposure is measured and compared to threshold values. Based on the pixel's response to the respective first exposure time, an optimal exposure is calculated for each pixel. The optimal exposure time is applied to each pixel by utilizing row-enabled and column-enabled signals at each pixel within the sensor.

25 Claims, 10 Drawing Sheets

(56) References Cited

OTHER PUBLICATIONS

Fish, A. et al., "Wide dynamic range snapshot APS for ultra low-power applications," IEEE Transactions on Circuits and Systems II: Express Briefs, vol. 52, No. 11, pp. 729-733, Nov. 2005. 5 pages.

McIlrath, Lisa, "A Low-Power Low-Noise Ultrawide-Dynamic-Range CMOS Imager with Pixel-Parallel A/D Conversion," IEEE Journal of Solid-State Circuits, vol. 36, No. 5, May 2001. 8 pages.

Yamada, T. et al., "A 140dB-Dynamic-Range MOS Image Sensor with In-Pixel Multiple-Exposure Synthesis," IEEE International Solid-State Circuits Conference, 2008. ISSCC 2008. Digest of Technical Papers, pp. 50-51,594, Feb. 3-7, 2008. 3 pages.

\* cited by examiner

INCREASING DYNAMIC RANGE USING MULTISAMPLING

BACKGROUND

In digital capture devices such as a digital camera, the device's dynamic range may be described as the ratio of maximum measureable light intensity to minimum measurable light intensity meaningfully used by the device. Dynamic range in such digital capture devices is often measured by powers of 2. That is, a digital camera having a dynamic range of, e.g., 10 exposure stops, may be described as having a possible dynamic range of 0-1023 (since $2^{10}=1024$).

The maximum amount of measureable light is limited by the saturation level of each pixel in the device's sensor. Light is measured at each pixel in an electronic cavity or well, which may be referred to as a photo detector. When the photo detector becomes full or "saturated" with photons, it begins to overflow and can no longer discern between additional incoming photons—thereby defining the camera's saturation level. Since larger photo detectors are capable of containing a greater range of photons, dynamic range is generally higher for digital capture devices that have larger pixels as compared to those with smaller pixels. In any event, the minimum amount of measurable light is limited by image noise, where the ratio between the incoming light and noise is too small for the signal to be clearly discernible.

Dynamic range is further limited by the precision at which brightness levels can be translated into digital values. In digital capture devices, an analog-to-digital converter (ADC) translates the continuous light signal incident upon a sensor into discrete numerical values. The accuracy of an ADC can be described in terms of bits of precision. As an example, a 10-bit ADC can translate a signal into 1024 brightness levels (e.g., a brightness range of 0-1023) since $2^{10}=1024$ levels.

Attempts to overcome these limitations involve, among other things, exposing the image sensor multiple times and summing the information collected during each exposure. This process is computationally intensive and typically requires post processing of an image, i.e., beyond the processing performed with the sensor itself.

BRIEF DESCRIPTION OF THE DRAWINGS

For a more complete understanding of the concepts described herein, reference is now made to the following descriptions taken in conjunction with the accompanying drawings, in which.

DETAILED DESCRIPTION OF THE EMBODIMENTS

Figure 1A:
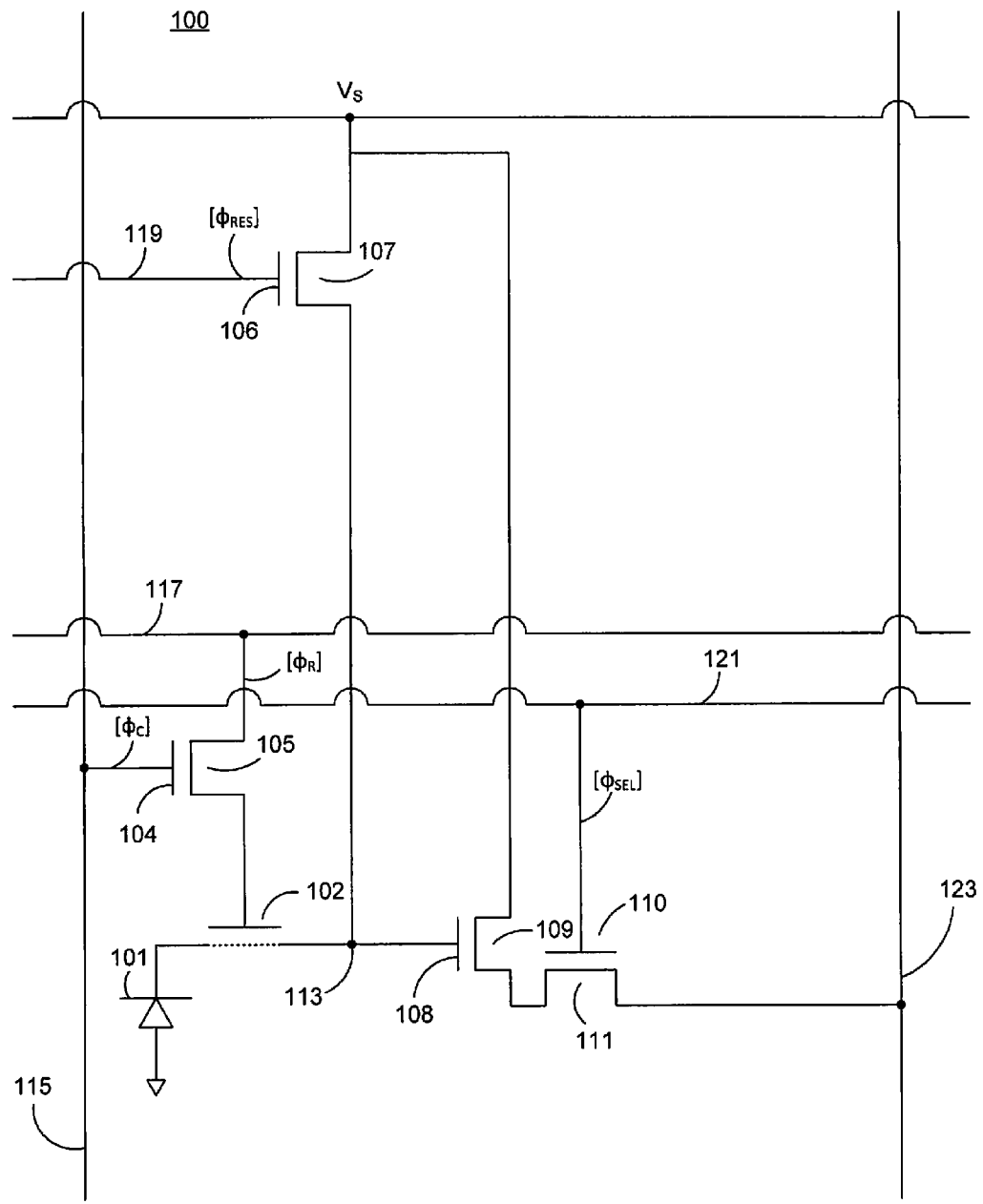
FIG. 1A is a circuit diagram of a pixel element according to an embodiment.

Concepts described herein increase the effective dynamic range of an image sensor by exposing each pixel in an array for an optimal exposure time that is based on each pixel's response to one or more first exposure times. As a result, an image having high dynamic range may be output from the image sensor after each pixel has been twice exposed. A logic may be implemented that provides both row-enabled and column-enabled signaling to effectuate the optimal exposure time on a pixel-by-pixel basis. That is, a combination of row-enabled reset signals and column-enabled mask signals operate to: 1) selectively provide short exposure times for pixels exposed to bright details of a scene during a first exposure (i.e., by effectively minimizing the second exposure for those pixels) and 2) selectively provide longer exposure times for pixels exposed to dark details of the scene during the first exposure (i.e., by effectively maximizing the second exposure for those pixels).

To illustrate the concepts described herein, consider the example of a 12 bit image sensor having 8 unique exposure times or "stops" (stops generally refer to a halving or doubling of light per stop—various embodiments arrange times in stops, but others may use different ratios of exposures) available per frame. Let "M" represent the bit depth or resolution of the image output from the sensor in a standard mode of operation (i.e., one exposure, without increasing dynamic range as described herein) and let "N" represent the number of unique exposure times. In this example M=12 and N=8. As will be further discussed, by applying the described concepts where each of the N exposures are a stop apart in exposure duration, the bit depth or resolution of an image may be effectively extended to a value of (M+N−1).

Following the same example, each pixel in the sensor's pixel array may be exposed for a first exposure time, $T_1$ (i.e., where $T_1$ can be one of N=8 unique exposure times in the current example, or a previous frame in a video mode, where the frames are gathered using dynamic range extension and thus the first exposure time may vary per pixel). Each pixel's response to the first exposure time, $T_1$, is readout from the array. The digitized value of each initial pixel response is normalized and compared to normalized threshold digital values. It should be appreciated that according to the concepts described herein, where the digital values are normalized between a value of 0 and 1, a sensor having N unique exposure times may provide N−1 comparison values. That is, for exposure times spaced at one-stop intervals, each of the N exposure times may be further expressed by the relative ratio $1/2^n$, $0<n<N$. In this example, for N=8 unique exposure times, the comparison values may be expressed as $[1/2, 1/2^2, 1/2^3, 1/2^4, \ldots 1/2^{N-1}]$.

In response to the comparisons, in one implementation the digitized value of each initial pixel response is coded as a k-bit digital word, where $2^k=N$. As seen, where there are N=8 unique exposure times, each initial pixel response value will be coded as a 3-bit digital word. Each digital code word is associated with an optimal exposure that is applied to each pixel during a second exposure time $T_2$. As a result, each pixel is exposed for an optimal exposure where, for each pixel, the duration of the optimal exposure is calculated based on its response to the first exposure time, $T_1$. More specifically, for each pixel, an optimal exposure is calculated based on a comparison between each pixel's initial response to first exposure time, $T_1$ and the N−1 comparison values. In another implementation, the digitized value of each initial pixel response is coded into N−1 bit planes corresponding respectively to N−1 available reset times, where each bit plane contains a "1" for a pixel if that pixel is to be reset at that time. In this alternate implementation, each row of pixels can be represented by N bit planes, each of which can be recalled just prior to each of the N reset times to control which resets occur on that row.

The optimal exposure is applied during the second exposure time $T_2$ according to a second exposure time reset sequence. The second exposure time reset sequence may be effectuated by row-enabled and column-enabled signals asserted at each pixel. According to one embodiment, during the second exposure time $T_2$, N row reset signals are asserted for each row at time intervals [0, 1-1/2, 1-1/2$^2$, 1-1/2$^3$, 1-1/2$^4$, ... 1-1/2$^{N-1}$] by row-enabled signals on a row-by-row basis (e.g., by implementing a vertical rolling shutter). However, during the second exposure time $T_2$, column-enabled signals mask all but one of the row-enabled reset signals (or alternately, mask all of the reset signals up to the one that will determine the exposure time for a specific pixel). When a row-enabled reset signal is masked by a given column-enable signal, the pixel at (row, col) will not be reset. As will be discussed, the row-enabled and column-enabled signals are asserted in response to instructions output from an exposure control logic within the image sensor.

These concepts are further illustrated in Table 1:

TABLE 1

| Normalized Pixel Response Value After First Exposure Time, $T_1 = \frac{1}{2}^7$ | Associated Digitized Code Word | Optimal Fractional Exposure During Second Exposure Time $T_2$ | Second Exposure Reset Sequence (also bitplane contents for bitplane implementation) |
|---|---|---|---|
| [½ < x < 1] | 111 | ½$^7$ | -------1 |
| [½² < x < ½²] | 110 | ½$^6$ | ------10 |
| [½² < x < ½³] | 101 | ½$^5$ | -----100 |
| [½³ < x < ½⁴] | 100 | ½$^4$ | -----1000 |
| [½⁴ < x < ½⁵] | 011 | ½$^3$ | ---1_0000 |
| [½⁵ < x < ½⁶] | 010 | ½$^2$ | --10_0000 |
| [½⁶ < x < ½⁷] | 001 | ½$^1$ | -100_0000 |
| [½⁷ < x < 0] | 000 | ½$^0$ | 1000_0000 |

Referring to Table 1, for a given pixel, a logic value 0 asserted on a column line masks a row reset signal asserted on a row line on all but one of time intervals [0, 1-1/2, 1-1/2$^2$, 1-1/2$^3$, 1-1/2$^4$, ..., 1-1/2$^{N-1}$], whereas a logic value 1 asserted on a column line effectively resets that pixel at one time interval (a "–" represents a "do not care condition," where the reset signal can either be masked or not depending on the implementation). Each initial pixel response value is directly proportional to the intensity of light incident upon that pixel during the first exposure time, $T_1$ (in this example, $T_1 = T_2/2^7$). High pixel response values (e.g., those measured between 1 and 1/2) are coded as high value code words (e.g. 111). However, the code word values are inversely related to the second exposure values (e.g., code 111 corresponds to the shortest optimal exposure of $T_2/2^7$). To apply an optimal exposure of $T_2/2^7$ during the second exposure time $T_2$ to a particular pixel, the last row reset signal asserted for that pixel's row is unmasked. A pixel having an initial response value coded as 111 is reset at the last possible time interval during second exposure time $T_2$ so that it has the shortest possible integration time during second exposure time $T_2$. On the other hand, a pixel having an initial response value coded as 000 is immediately reset during second exposure time $T_2$ so that it has the longest possible integration time during second exposure time $T_2$. With further reference to Table 1, a pixel having an initial response value coded as 011 is reset at time interval 1-1/2$^3$, is exposed for $T_2/2^3$, and has a final exposure-weighted digitized value of $2^3*V$, where V is the raw digitized pixel value for that pixel. As seen, only one row reset signal may be applied to each pixel according to that pixel's associated k-bit digital code word.

Figure 1B:
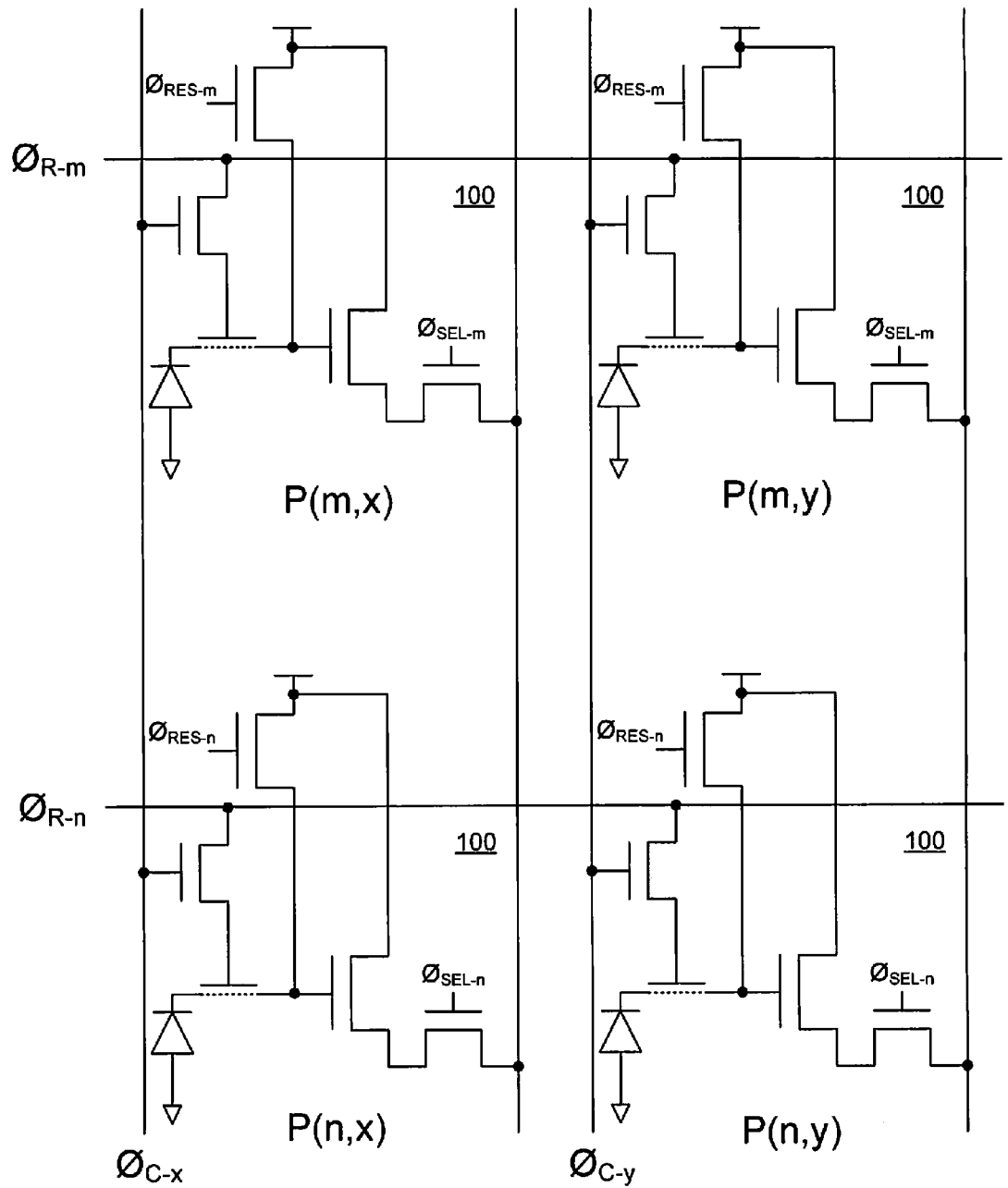
FIG. 1B is a circuit diagram of a partial pixel array according to an embodiment.

FIG. 1A is a logic diagram of a pixel element 100 and FIG. 1B is a logic diagram of a pixel element array 120 that may be utilized to implement the concepts described herein. Each pixel element 100 is exposed for an initial exposure time, $T_1$, which is the same for each pixel element 100 in the pixel array 120. The output signal for each pixel element 100, which may be thought of as, e.g., the previously-discussed pixel response values or pixel intensity values, is read for each pixel on an array-wide basis. The output signal value for each pixel element 100 is compared to incremental values or thresholds. Based on the comparisons, an optimal exposure is determined for each pixel element 100, with the optimal exposure to be applied during a second exposure time $T_2$. Afterward, the combination of signals asserted on the column control line 115, the row control line 117, row reset line 119, and row select line 121 effectuate a vertical rolling shutter and column-specific signaling so that each pixel element 100 is optimally exposed during a second exposure time $T_2$. According to such an embodiment, multiple row reset signals are asserted on each of the row reset lines, but the values asserted on the column control line 115 function to mask all but the appropriate reset signal(s) for each pixel. The masks are applied on a column-wise basis along each row of pixel elements 100.

Referring to FIG. 1A, a pixel element 100 includes a photo detector 101, a transfer gate 102, a transfer transistor 105, a reset transistor 107, a source-follower transistor 109, a select transistor 111, and a floating diffusion region 113. A column transfer gate control signal, [$\Phi_C$], is input on the column control line 115, a row transfer gate control signal, [$\Phi_R$], is input on the row control line 117, a row reset signal, [$\Phi_{RES}$], is input on row reset line 119, and a row select signal, [$\Phi_{SEL}$], is input on row select line 121. Signals are readout from each pixel element 100 on an associated column readout line 123. A voltage source, $V_S$, is supplied on a like-named voltage node, to provide power to pixel element 100.

The photo detector 101 operates to accumulate photo-generated charge that is selectively transmitted to the floating diffusion 113 when an appropriate voltage is applied to transfer gate 102 according to signals asserted on the column control line 115 and the row control line 117. According to the illustrated embodiment, the photo detector 101 is shown as a pinned photodiode. However, it should be appreciated that the photo detector 101 may comprise other photosensitive devices that produce electrical charge in response to incident light, such as a photo gate, phototransistor, photoconductor, or other photon-to-charge converting device, as the initial accumulating area for photo-generated charge. The photo detector 101 may include a p+ surface accumulation layer and an underlying n-charge accumulation region formed in a p-type semiconductor substrate.

The transfer gate 102 is operable to form a channel between the photo detector 101 and the floating diffusion region 113. An operating cycle for each pixel element 100 comprises the steps of: photodiode reset, integration (also called exposure)

and transfer. The terms "exposure" and "integration" are used interchangeably. According to one embodiment, during the reset and transfer phases, the signal asserted at the transfer gate 102 is pulsed high to form a channel between the photodetector and the floating diffusion. During integration, the signal asserted at the transfer gate is low to prevent channel formation to the floating diffusion, and charge accumulates at the photo detector 101. The electrical signal produced by the photo detector 101 when it is exposed to light may be referred to as the pixel intensity value or the pixel response value, which is proportional to the intensity of the incident light and the period of the exposure time. During the transfer phase, the accumulated charge is transferred completely to the floating diffusion region 113.

The second transfer transistor 105 includes a gate 104 connected to the column control line 115, and a source and drain connected respectively to the row control line 117 and the first transfer gate 102. As will be further discussed, the second transfer gate receives both row-enabled and column-enabled transfer gate signals that, operating together, allow an optimal exposure to be applied to a given pixel. The gate 104 receives a column transfer gate control signal, $[\Phi_C]$, asserted on the column control signal line 115. The second transfer transistor 105 also receives a row transfer gate control signal, $[\Phi_R]$, asserted on the row control signal line 117. At each photodiode reset and at the end of an exposure time, the accumulated charge on photodiode 101 is transferred to the floating diffusion region 113 by the transfer gate 102 according to the signal asserted by the second transfer transistor 105 and received at the transfer gate 102, which itself depends on the respective signals asserted on the column control signal line 115 and the row control signal line 117.

The reset transistor 107 includes a reset gate 106 and a source and drain connected, respectively, to $V_S$ and to the floating diffusion region 113. The reset gate 106 receives a reset signal, $[\Phi_{RES}]$, asserted on the reset signal line 119. In response to the reset signal, $[\Phi_{RES}]$, the reset transistor 107 operates to reset the floating diffusion 113 in conjunction with pixel reset operations, for a reset read phase in a correlated double sampling (CDS) operation, etc. As a result, a reset voltage is applied from the supply voltage node (supplying voltage, $V_s$) to charge the floating diffusion region 113 in response to assertion of $\Phi_{RES}$. This causes the pixel element 100, when selected, to output a voltage reset signal, at transistors 109 and 111. That is, the reset transistor 107 resets the floating diffusion region 113 to a reset charge level by connecting it to the supply voltage, $V_s$, before (or during, for photodiode reset operations) each charge transfer from the n-accumulation region of the photo detector 101.

In operation, the photodiode 101 of and floating diffusion 113 of a pixel element 100 may be reset where both the second transfer transistor 105 and reset transistor 107 are on, and the row transfer gate control signal $\Phi_R$ is asserted. When the second transfer transistor 105 is turned on and the row transfer gate control signal $\Phi_R$ is deasserted, a pixel exposure or integration period begins. The time difference between a photodiode reset and its subsequent readout is the pixel exposure time, also known as integration time.

The source follower transistor 109 includes a source follower gate 108, a source, and a drain, connected respectively to floating diffusion 113, signal source voltage node, $V_S$, and the source of a row select transistor 111. As such, the source follower transistor 109 is controlled by a voltage at floating diffusion region 113 and operates to provide a pixel output signal to the row select transistor 111.

The row select transistor 111 includes a row select gate 110, a source, and a drain, connected respectively to column select line 121, the drain of source follower transistor 109, and the column readout line 123. The pixel element 100 is read out by asserting the select signal, $[\Phi_{SEL}]$, to cause the row select transistor 111 to conduct. The row select gate 110 receives the select signal, $[\Phi_{SEL}]$, asserted on row select signal line 121. In response, the row select transistor 111 operates to selectively gate the pixel output signal to the column readout line 123, depending upon the value of $[\Phi_{SEL}]$ and the signal received from the source follower transistor 109. The column readout line 123 receives the pixel output signal during read operations. The column readout line 123 connects to a column current source and analog/digital conversion circuitry (not shown).

Asserting the column transfer gate control signal, $[\Phi_C]$, on the column control line 115 allows the row transfer gate control signal to influence transfer gate 102. According to the illustrated embodiment, the previously-discussed reset signals may be selectively masked to control the exposure times for individual pixel elements 100. That is, pixel elements 100 in a given row subject to multiple reset signals are further controlled during the charge transfer process in a column-wise manner. Using the column-enabled control signals, $[\Phi_C]$, to selectively mask the row-enabled reset signals, $[\Phi_{RES}]$, allows: 1) pixel elements previously determined to receive a high amount of incident light to be controlled to short exposure times, while pixel elements previously determined to receiving a low amount of incident light are allowed to continue accumulating charge.

Referring to FIG. 1B, pixel array 120 comprises a plurality of pixel elements 100 arranged in a predetermined number of columns and rows, with each pixel element 100 being constructed as illustrated and described above with respect to FIG. 1A. The pixel element array 120 is illustrated as a 2×2 pixel element array having rows m and n and columns x and y. As such, the four pixel elements 100 may be respectively addressed with the following notations: P(m,x), P(m,y), P(n, x), and P(n,y). It should be appreciated that the pixel element array 120 is representative of any array having (N number of columns)*(M number of rows) pixel elements 100.

According to one embodiment for implementing the concepts described herein, the pixel elements 100 are controlled on a row-by-row basis, where pixel elements 100 on the $m^{th}$ row are controlled by a row transfer gate control signal, $[\Phi_{R-m}]$, a row reset signal, $[\Phi_{RES-m}]$, and a row select signal, $[\Phi_{SEL-m}]$, whereas pixel elements 100 on the $n^{th}$ row are controlled by a row transfer gate control signal, $[\Phi_{R-n}]$, a row reset signal, $\Phi_{RES-n}]$, and a row select signal, $[\Phi_{SEL-n}]$. The pixel elements 100 are further controlled on a column-by-column basis, where pixel elements 100 on the $x^{th}$ row are controlled by a column transfer gate control signal, $[\Phi_{C-x}]$, and pixel elements 100 on the $y^{th}$ row are controlled by a column transfer gate control signal, $[\Phi_{C-y}]$.

Figure 2:
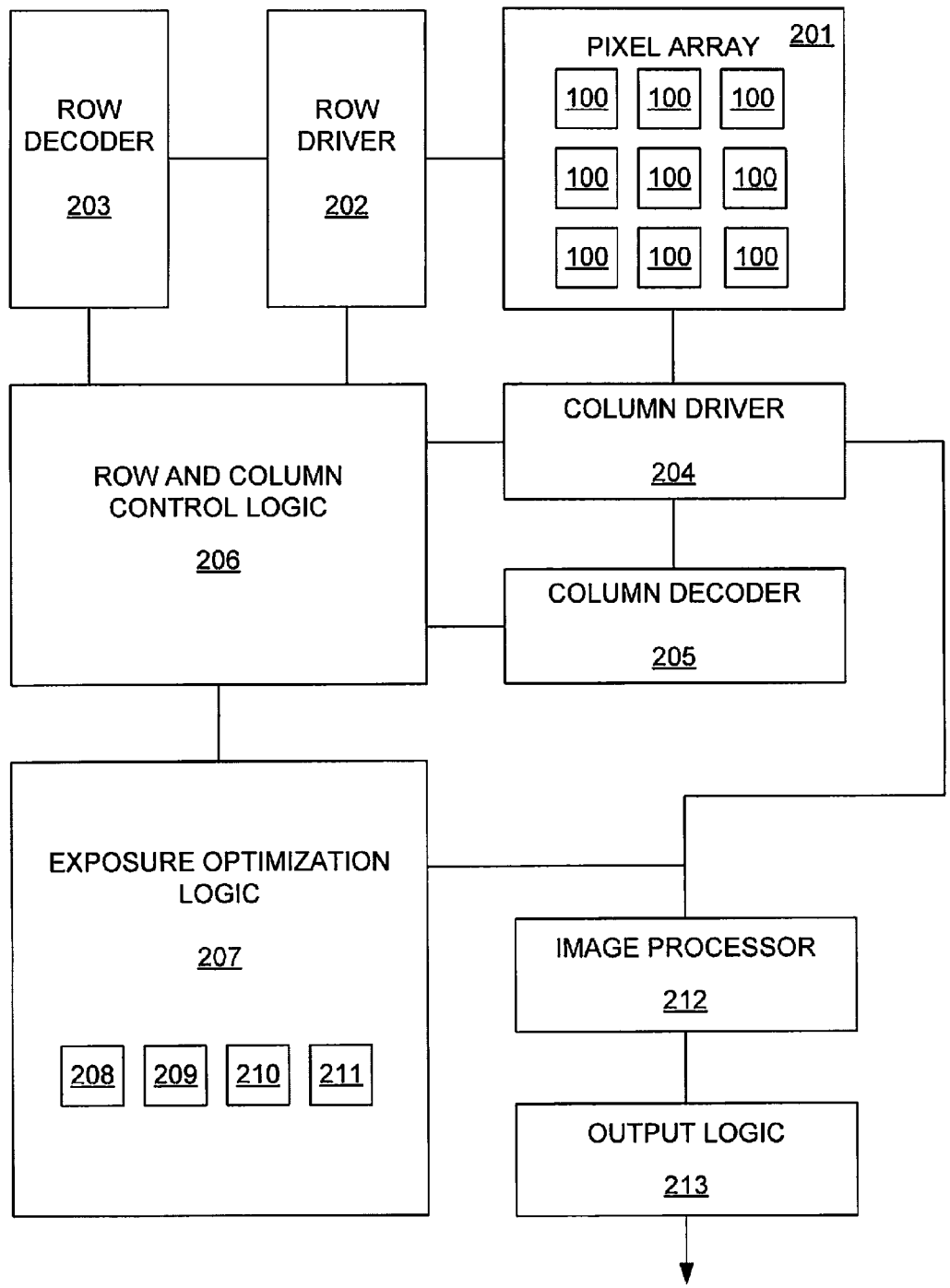
FIG. 2 is a block diagram of an image sensor according to an embodiment.

FIG. 2 illustrates exemplary logic of an image sensor that may be implemented to expose each pixel for an optimal exposure time based on the pixel's initial response, effectively increasing the dynamic range of the image sensor according to the concepts described herein. As such, the sensor 200 comprises various logic that cooperates to perform optimal integration time for each pixel. It will be understood by those in the art that functions performed by each block in the logic may be collocated in a single block, or separated in different blocks or combinations of blocks, according to system parameters and the like. Further, all of the logic illustrated at FIG. 2 may be provided on a single semiconductor device or may be distributed among several separate devices. The logic illustrated at FIG. 2 performs operations on pixels, such as the pixel elements 100 illustrated in FIGS. 1A & 1B, and may be formed in the same substrate as the pixel elements 100. As such, the embodiment illustrated at FIG. 2 will be discussed with reference to pixel elements 100 and/or pixel element array 120, as illustrated in FIGS. 1A & 1B.

A pixel array 201 comprises a plurality of pixel elements 100 arranged in a predetermined number of columns and rows and may be constructed as illustrated and described above with respect to FIGS. 1A & 1B. As previously-discussed, the pixel elements 100 are controlled on a row-by-row basis, where pixel elements 100 on a row are controlled by a row transfer gate control signal, $[\Phi_R]$, a row reset signal, $[\Phi_{RS}]$, and a row select signal, $[\Phi_{SEL}]$. The pixel elements 100 are further controlled on a column-by-column basis, where pixel elements 100 on a column are controlled by a column transfer gate control signal, $[\Phi_C]$.

The sensor 200 is operated in part by an exposure optimization logic 207 where the initial pixel response values readout from the pixel array 201 after the initial exposure time $T_1$ are processed and utilized to calculate an optimal exposure time for each pixel element 100 during the second exposure time $T_2$. Exposure optimization logic 207 calculates an optimal exposure time for each pixel element 100 by comparing the digitized value of the initial pixel response signal to threshold values. Each of the initial response values and the threshold values may be normalized. Based on the comparisons, the exposure optimization logic 207 determines an optimal exposure sequence that is effectuated according to selective column control and row control signaling.

Exposure optimization logic 207 sends instructions to row and column control logic 206, which controls address row decoder 203 and column decoder 205 for selecting the appropriate row and column lines for pixel readout operations and reset operations. The row and column exposure control logic 206 also receives instructions to control the row driver logic 202 and the column driver logic 204 such that they apply driving voltages to the second transfer transistor 105 in each pixel element 100 on the selected rows and columns to optimize exposure times according to a reset sequence calculated by the exposure optimization logic 207. The instructions in exposure optimization logic 207 perform various functions, such as the readout and reset operations described herein, may be stored in hard-coded form, such as in an Application Specific Integrated Circuit, or it may be stored in some form of reconfigurable processing apparatus, such as a logic array (programmable array, reconfigurable array) or a general-purpose processor which executes control software.

To readout pixel response values and perform reset operations, after both the first exposure time $T_1$ and the second exposure time $T_2$, sensor 200 may operate by utilizing a rolling shutter. In that case, rows of the pixel elements 100 are sequentially selected for readout and/or reset operations. As such, during the first exposure time $T_1$, the integration or exposure time is the same for all pixels on all rows, but shifted in time.

During readout, each of the pixel elements 100 in a selected row outputs, to respective readout logic, a pixel reset signal and a pixel response signal. The frame time, which is defined by the time between first row readouts in consecutive frames, represents the time period required to read each row in the entire sensor (plus additional integration time if so configured). A row of the pixel elements 100 in the array 201 is selected by the exposure optimization logic 207 by sending a row address from the exposure optimization logic 207 to the row decoder 203. The row decoder 203 decodes the row address and operates the row driver 202. The row driver 202 asserts the row select signal, $[\Phi_{SEL}]$ on the respective row select signal line 121 at each pixel element 100 in the selected row. The assertion of the row select signal, $[\Phi_{SEL}]$, causes the row select transistor 111 of each pixel element 100 in the selected row to conduct. The assertion of the row reset signal, $[\Phi_{RES}]$, resets the floating diffusion of each pixel in the selected row. The pixel reset signal is read from each pixel element 100 immediately after the floating diffusion region 113 is reset. After the pixel reset signals for the current row are read, the row decoder 203 asserts the row transfer gate control signal, $[\Phi_R]$, for the current row.

The exposure optimization logic 207 operates the column decoder 205 to cause the column driver 204 to assert the column transfer gate control signal, $[\Phi_R]$, for all columns, while the row transfer gate control signal is asserted. This transfers the integrated charge from all photodiodes on the current row to their respective floating diffusions for readout. Also, the respective pixel response signal is readout on each column readout line 123 after the pixel's integration time. In one embodiment, the column driver 204 includes column-based pixel readout logic corresponding to the number of pixel elements 100 in each row of the pixel array 201. As such, each pixel element 100 in a selected row is associated with its own column control line 115 and a corresponding pixel readout logic. This allows each pixel element 100 in the selected row to output its respective pixel reset signal and pixel response signal during a given row read operation, e.g., at the end of the first exposure time $T_1$ and the end of the second exposure time $T_2$.

Exposure optimization logic 207 may further perform shutter functions by synchronizing operation of the control signals which control respective integration times of each of the pixels of the array 201. As such, during the first readout operation, the integration time for each pixel is the same. However, for exceedingly bright areas of an image, the magnitude of incident light may be higher than the capacity of the photodiode 101. In that case: 1) the true response values are not read because the pixel element 100 fails to record the full value of incident light, and 2) depending on sensor design, excess charge may spill over to (or "bloom" to) other pixel elements 100, creating additional erroneous pixel response values. For exceedingly dark areas of an image, the magnitude of incident light may be lower than what the photodiode 101 is able to distinguish from shot noise and read noise. In that case, the true response values are of limited use because the pixel element 100 fails to reliably measure light flux from the relatively small amount of incident light. Without more, the resulting image would include "blown out" highlights or white spots and/or black dark spots with high amounts of noise.

The second readout operation is performed after an optimal exposure is applied to each pixel element 100. The optimal exposure is calculated based on the response values read for each pixel element 100 during the first readout operation, after first exposure time $T_1$. As such, the optimal exposure time will not be the same for each pixel element 100. During the second readout operation, the reset signal timing applied to each pixel element 100 is tailored to that pixel. The optimal exposure time is shorter for pixels initially exposed to bright areas of an image (i.e., for those pixel elements 100 producing high or saturated voltage response signals) and longer for pixels initially exposed to dark areas of an image (i.e., for those pixel elements 100 producing low voltage response signals or none at all).

An embodiment of exposure optimization logic 207, which may or may not be on the same chip as image sensor 200, comprises a comparison logic 208, a storage logic 209, a photodiode reset logic 210, and a second exposure reset schedule logic 211, that cooperatively provide exposure time adjustments to optimize exposures for each pixel element 100. According to an embodiment, within the exposure optimization logic 207, the comparison logic 208 samples the first exposure response signals output from the column driver 204 and compares them to internally generated thresholds. The generated thresholds correspond to normalized threshold values that are incremented between a maximum and a minimum value and, in this embodiment, have a binary relationship. For example, the threshold values may be incremented according to the formula $1/2^n$ where n=1, 2, 3, 4, . . . N−1, where as previously-discussed, N is the number of unique exposure times or stops available to the image sensor.

To compare the initial pixel response signals to the threshold values, the comparison logic 208 may retrieve the normalized threshold values from the storage logic 209. The storage logic 209 may store the threshold values (whether or not in a normalized form) in, e.g., a table or similar storage structure for comparison with the initial pixel response signal values. Additionally, based on the comparisons, the comparison logic 208 encodes the initial pixel response values from each pixel element 100 as a digital code word that corresponds to a new, optimal exposure time. As previously discussed, the code word can be k-bits in length, where $2^k$=N. In this way, each pixel element 100 is assigned an optimal exposure time based on how its initial response value compares to the threshold values. The new exposure times will be relatively short for pixel elements having relatively high initial response values and relatively long for pixel elements having relatively low initial response values.

During operation, the storage block 209 may store the coding information indicating the associated new exposure time, corresponding to the initial pixel response values of each pixel element 100. As such, all available digital codes and their associated exposure times may be written in the storage logic 209, while information sufficient to maintain each pixel's association with a digital code word and specific exposure times may be written to, and read from, the storage logic 209 on an iterative basis. The storage logic 209 may retain instructions to store the encoded digital words representing the new exposure times for a specific period of time or for a determined number of exposure frames. For example, the storage block 209 may be programmed to store the information for one exposure frame period. The storage block 209 may delete or replace the stored exposure time information as each row is revisited for a new frame, for example. In this way, the storage block 209 is cleared to receive and temporarily store exposure information for the immediately-following exposure frame.

Once the initial pixel response values have been compared to the threshold values, digitally encoded, and associated with a new corresponding exposure time, the second exposure reset schedule logic 211 stores integration time values for each pixel element 100. Reset schedule logic 211, operating in or in conjunction with exposure optimization logic 207, may calculate a reset sequence. According to an embodiment, second exposure reset schedule logic 211 and exposure optimization logic 207 operate to assert N number of row resets on a row-wise basis while asserting signals on a column-wise basis to effectively mask any reset that occurs after the preferred reset for each pixel during the second exposure time, $T_2$, that yields the optimal exposure time for each pixel, as calculated by exposure optimization logic 207.

As known in the art, blooming can occur when a photodiode or other photosensitive device is overexposed, i.e., the photo detector 101 is exposed to more photons than it is capable of absorbing and converting to electrons. This is typically due to exposure of a pixel to an overly intense light source, or to exposing the pixel for too long a period of time. The excess electrons can spill over into pixels in nearby rows and columns. This overflow distorts the image, and can wash out portions of the image near the overexposed portion. To prevent blooming, an embodiment may apply more than one reset to pixels that will receive relatively short exposure times. In one such embodiment, every pixel on a given row is unconditionally reset at the beginning of the second exposure period for that row. In other embodiments, each following reset for a row can be applied to all pixels that have yet to begin their optimum exposure interval.

Exposure optimization logic 207 and/or image processor 212 scales the measured pixel response values after the second exposure time $T_2$ for a given row, e.g., by multiplying each pixel's response by its relative exposure value. For instance, if a pixel was exposed for the entire interval $T_2$, it is multiplied by 1; if the pixel was exposed for half the interval, it is multiplied by 2; etc. In the special case where the intervals are spaced at one-stop intervals, the multiplication can be accomplished by bit-shifting the raw pixel value, or attaching the multiplication factor as an exponent. The Image processor 212 transmits the scaled data to the output logic 213, which then transmits the processed data to an output device, application, or program, as appropriate.

Figure 3:
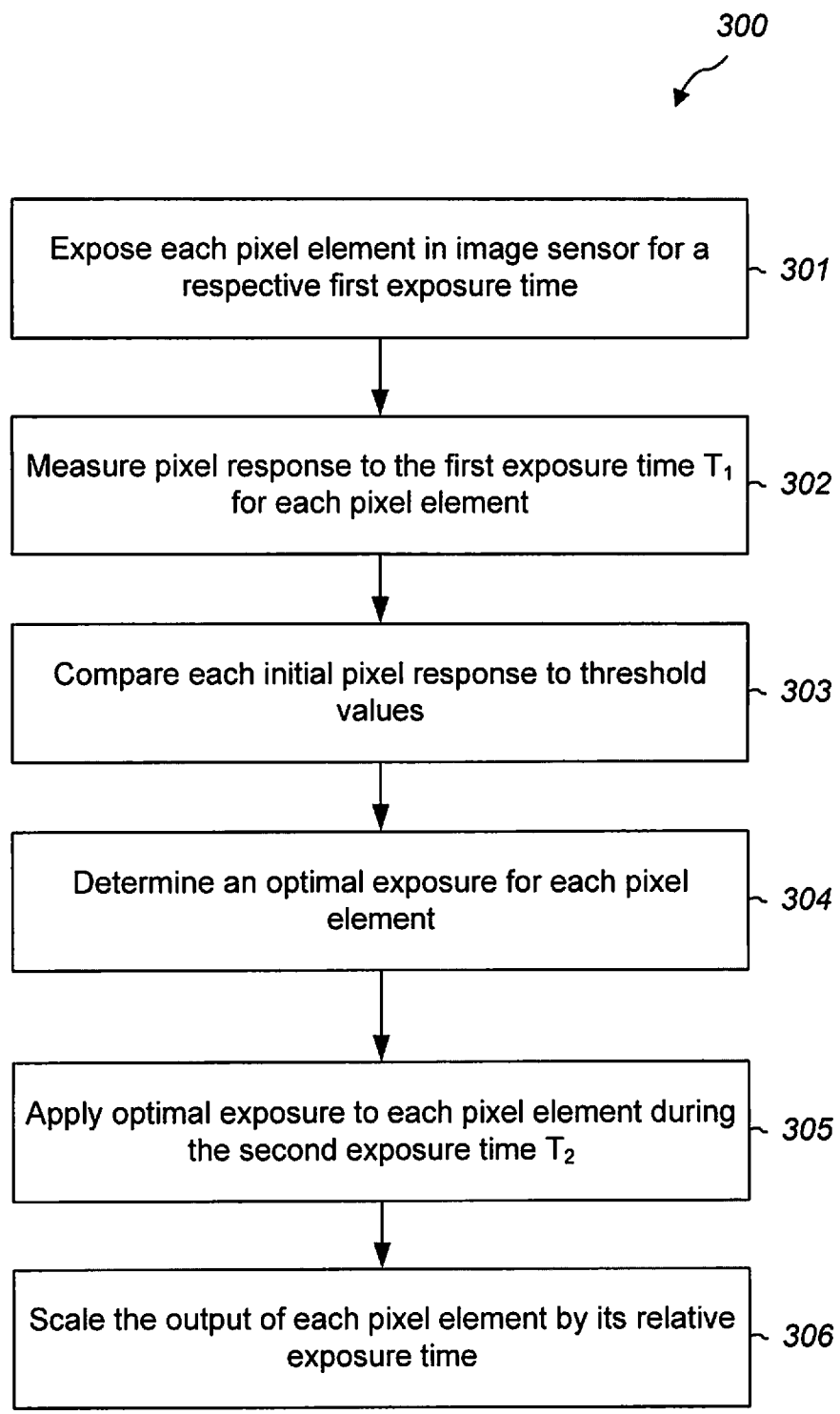
FIG. 3 is a flow chart of a method according to an embodiment.

FIG. 3 contains a flow chart 300 of a method for increasing the effective dynamic range of an image sensor utilizing only two exposures according to the concepts described herein. The method illustrated in FIG. 3 may be performed by a system such as that illustrated in FIG. 2, utilizing pixel architectures illustrated at FIGS. 1A and 1B, to extend the dynamic range of a sensor having M bit resolution to a sensor having (M+(N−1)) bit resolution, where N is the number of unique exposure values or stops available to the image sensor.

At step 301, each pixel in the image sensor is exposed for a first exposure time (or integration time) $T_1$ that is shared by each pixel in the image sensor. Referring to the embodiments illustrated at FIGS. 1A and 1B, where each pixel element 100 is addressed according to its respective row and column location as: P(m,x), P(m,y), P(n,x), and P(n,y), each pixel element 100 in the pixel array 120 will be exposed for the same period of time. According to such an embodiment, each photo detector 101 charges (or integrates) in response to light applied thereto for an initial time interval, i.e., the first or initial exposure time $T_1$.

The initial time interval may be selected or determined based upon different considerations. For example, the initial time interval may be calculated based an average light intensity value measured for a given scene at a given time. In that case, the initial time interval may be calculated with the goal of avoiding saturation and over exposure for the largest majority of pixels given the measured light intensity value for that scene. According to an embodiment, a default initial exposure time is set at $T/2^{N-1}$, where T is the frame exposure time (for instance, 1/30 sec or 1/60 sec for video).

At step 302, the response value of each pixel element to the first exposure time $T_1$ is measured. The measurement may be accomplished by reading out the pixel response values, row-by-row.

At step 303, the response values of each pixel element are compared to threshold values. Each of the pixel response values and the threshold values may be normalized. Further, as previously-discussed, the threshold values may have a binary relationship, expressed as $1/2^n$. The pixel response values may be coded as a digital word based on the comparison. According to one embodiment, the digital code word is a k-bit digital word, where $2^k$=N.

At step 304, an optimal exposure for each pixel is determined based on each pixel's response to the initial exposure time $T_1$. According to an embodiment, each previously-discussed digital code word corresponds to an optimal exposure to be applied to given pixels during the second exposure time $T_2$. Consistent with the discussion that the previously-discussed threshold values have a binary relationship, the optimal exposure times may, according to an embodiment, also have a binary relationship. The optimal exposures may be defined as a fraction of the second exposure time $T_2$, expressed as $T_2/2^n$.

At step 305, the optimal exposure time is applied to each pixel during the second exposure time $T_2$ according to a second exposure reset sequence. According to an embodiment, the second exposure reset sequence is effectuated by asserting N number of row resets on a row-wise basis during the second exposure time $T_2$. For each pixel, row reset signals occurring after the one effectuating the optimal exposure time for a given pixel are masked by asserting mask signals on a column-wise basis. During the second exposure time $T_2$ the N number of row-enabled reset signals turn on the reset transistors, such that when the column-enabled transfer transistor is turned on and the row transfer signal is activated, an exposure or integration period restarts for each pixel. However, by deasserting the column-enabled signals at the column-enabled transfer transistors one can effectively prevent the transfer gate being turned on for unwanted row reset signals. Following from the previous discussion, the column-enabled signal is asserted to allow each pixel to be reset so that the pixel finally integrates during the second exposure time $T_2$ for only the previously calculated optimal exposure for that pixel.

Figure 4:
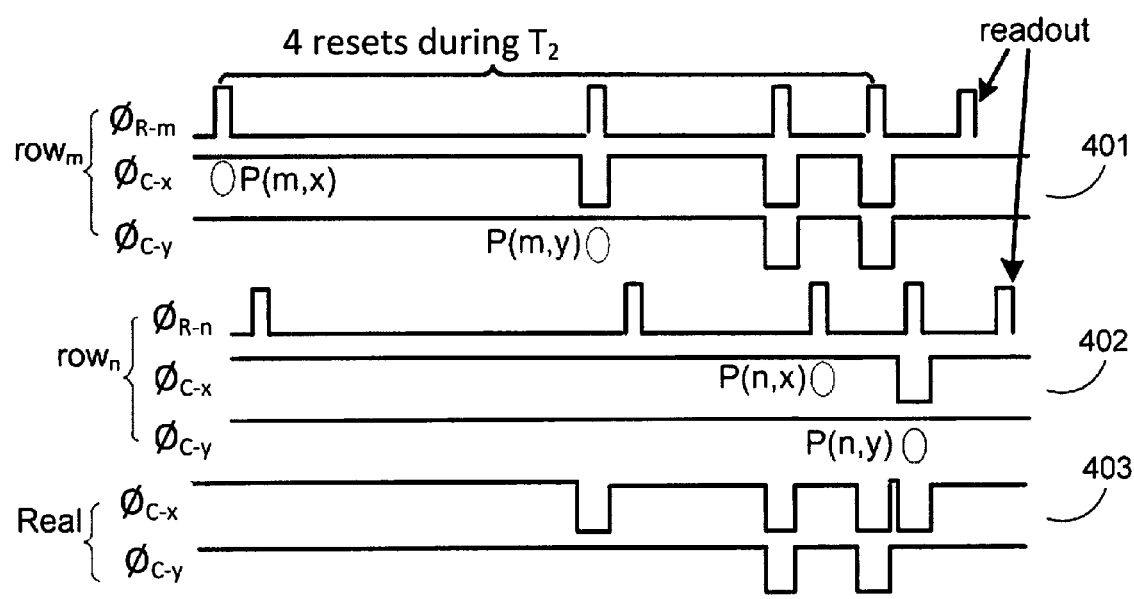
FIG. 4 is a signal timing diagram according to an embodiment.

FIG. 4 illustrates a timing diagram 400 for the row-enabled and column-enabled signals asserted during the second exposure time $T_2$ to apply optimal exposures to each pixel. For consistency, the notations used at FIG. 4 are the same as those used at FIGS. 1A and 1B. According to the illustrated embodiment, the 2×2 pixel array illustrated at FIG. 1B is considered so that a 2-bit integration code is utilized, which means that 4 row resets are applied to each row during the second exposure time $T_2$. Bit code 00 is applied to the pixel notated as P(m,x), Bit code 01 is applied to the pixel notated as P(m,y), bit code 10 is applied to the pixel notated as P(n,x), and bit code 11 is applied to the pixel notated as P(n,y).

The row-enabled reset signals are asserted at time intervals: 1, $1-1/2^1$, $1-1/2^2$, and $1-1/2^3$. These signals may be asserted as row control signals, where, at 401, a row control signal, $[\Phi_{R-m}]$, is asserted at pixel elements on the $m^{th}$ row and, at 402, a row control signal, $[\Phi_{R-n}]$, is asserted at pixel elements on the $n^{th}$ row. According to the illustrated embodiment, these row-enabled signals are noted by pulsed high signals. The column-enabled signals are also selectively deasserted at time intervals: 1, $1-1/2^1$, $1-1/2^2$, and $1-1/2^3$. These signals may be asserted as column control signals, where, at 401 and 402, pixels on the $x^{th}$ column are controlled by a column control signal, $[\Phi_{C-x}]$, and, at 401 and 402, pixel elements on the $y^{th}$ column are controlled by a column control signal, $[\Phi_{C-y}]$ (at 401 and 402, these signals have been deconstructed to illustrate the events affecting a given row, with the "real" sequence at 403 showing the combined column control signals). According to the illustrated embodiment, these column-enabled signals are noted by pulsed low signals, where a low signal prevents changes to a row control signal from affecting the transfer gates for pixels on that column. The column-enabled signals are deasserted according to, e.g., a reset sequence 10 effectively mask the reset signals that occur after the optimum exposure time for that pixel. The real, or composite, column-enable signals are illustrated at 403 as the combination of column control signals asserted during the second exposure time $T_2$ for pixels on all columns, i.e., pixels on columns x and y.

According to the dual exposure scheme described herein, multiple row resets are asserted on a row-by-row basis during the second exposure time $T_2$. Without more, this may require a schedule where multiple row control lines are "on" simultaneously and may cause confliction at the column control lines. To obviate the confliction, a time delay, $T_d$, may be added to selected row reset times to cause them to vary from a strict one-stop spacing. Adding the time delays $T_d$ addresses the confliction where the length of the delay is greater than that of the row control signal and less than that of the row time. For a given reset signal duration, different time delays may be applied to each reset, so that the corresponding error can be corrected if desired (by, e.g., post processing). These concepts are illustrated at TABLE 2 considering a frame duration T of 32 ms:

TABLE 2

| Reset Time (T = 32 ms) | Delay (us) | Error (relative to 1-stop exposure spacing) |
|---|---|---|
| $\frac{1}{2}^7$ | 0 | 0 |
| $\frac{1}{2}^6$ | 1 | 1/512 |
| $\frac{1}{2}^5$ | 2 | 2/1024 |
| $\frac{1}{2}^4$ | 3 | 3/2048 |
| $\frac{1}{2}^3$ | 4 | 4/4096 |
| $\frac{1}{2}^2$ | 5 | 5/8192 |
| $\frac{1}{2}^1$ | 6 | $6/2^{14}$ |
| $\frac{1}{2}^0$ | 7 | $7/2^{15}$ |

Figure 5A:
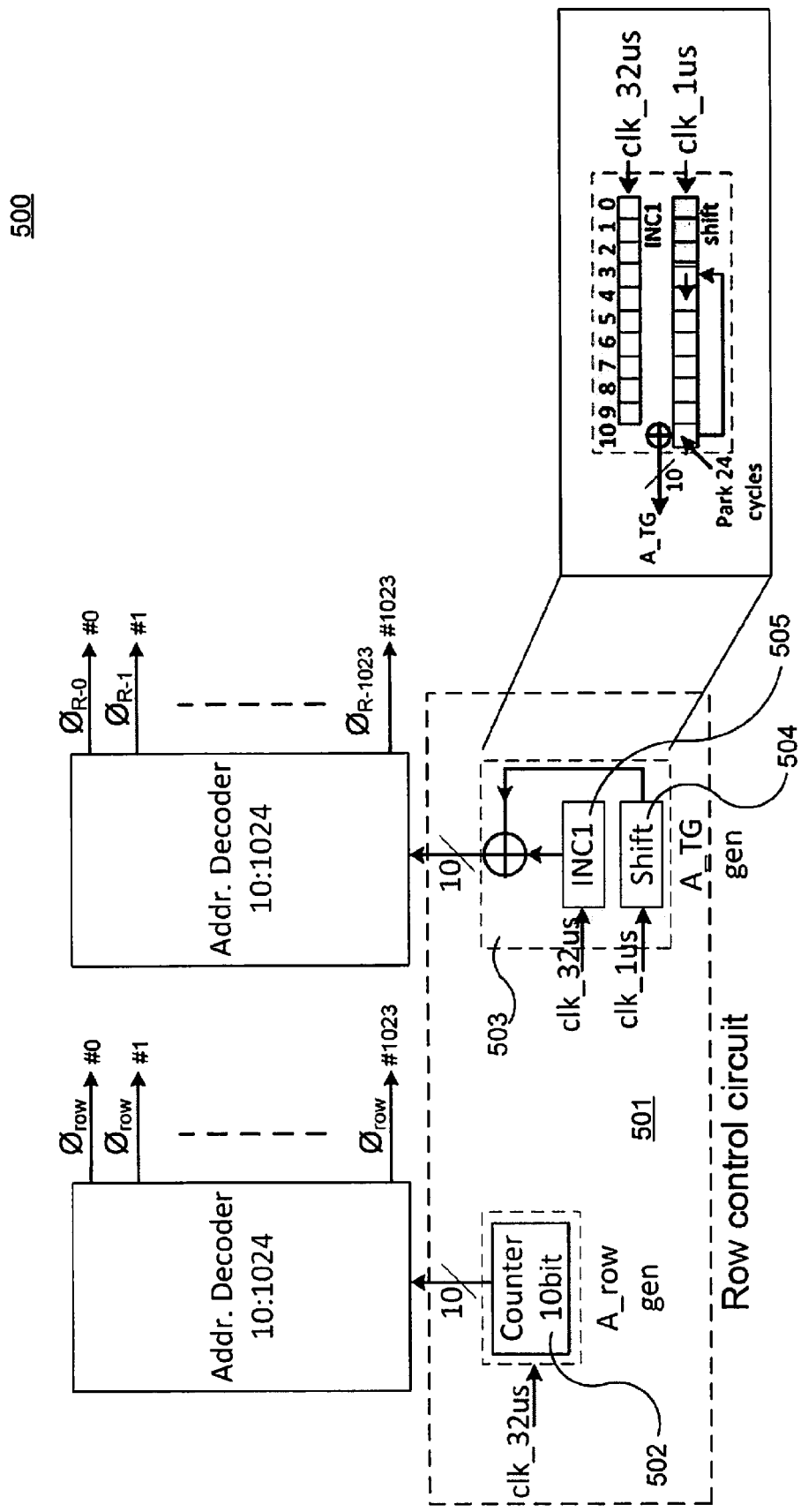
FIG. 5A is a circuit diagram according to an embodiment.

Logic for implementing appropriate time delays is illustrated at FIG. 5A. According to the illustrated embodiment, delay logic 500 includes a row control circuit 501 that creates appropriate time delays between the assertion of each row-enabled reset signal. Each row control circuit includes a counter block 502 and a delay block 503. The delay block 503 includes instances of a INC block 504 and a shift block 505. According to an embodiment, the shift block 505 may be implemented as a shift registers, or combination of shift registers, as known in the art. Delay logic 500 and its component logic may be implemented in one or a combination of row and column control logic 206 and/or exposure optimization logic 207 as illustrated in FIG. 2.

Figure 5B:
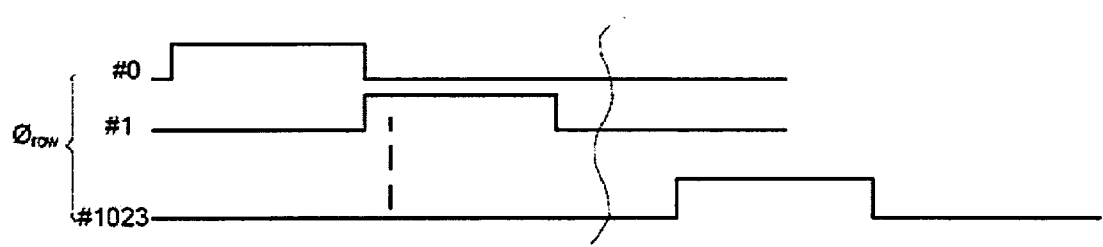
FIG. 5B is a signal timing diagram according to an embodiment.

FIG. 5B is a wave diagram illustrating the row-enabled reset signals after operation of delay logic 500. For rows 0-1023, the row-enabled reset signals are delayed in time to avoid confliction at the column control lines, which operate to mask the appropriate row-enabled reset signals.

Figure 6:
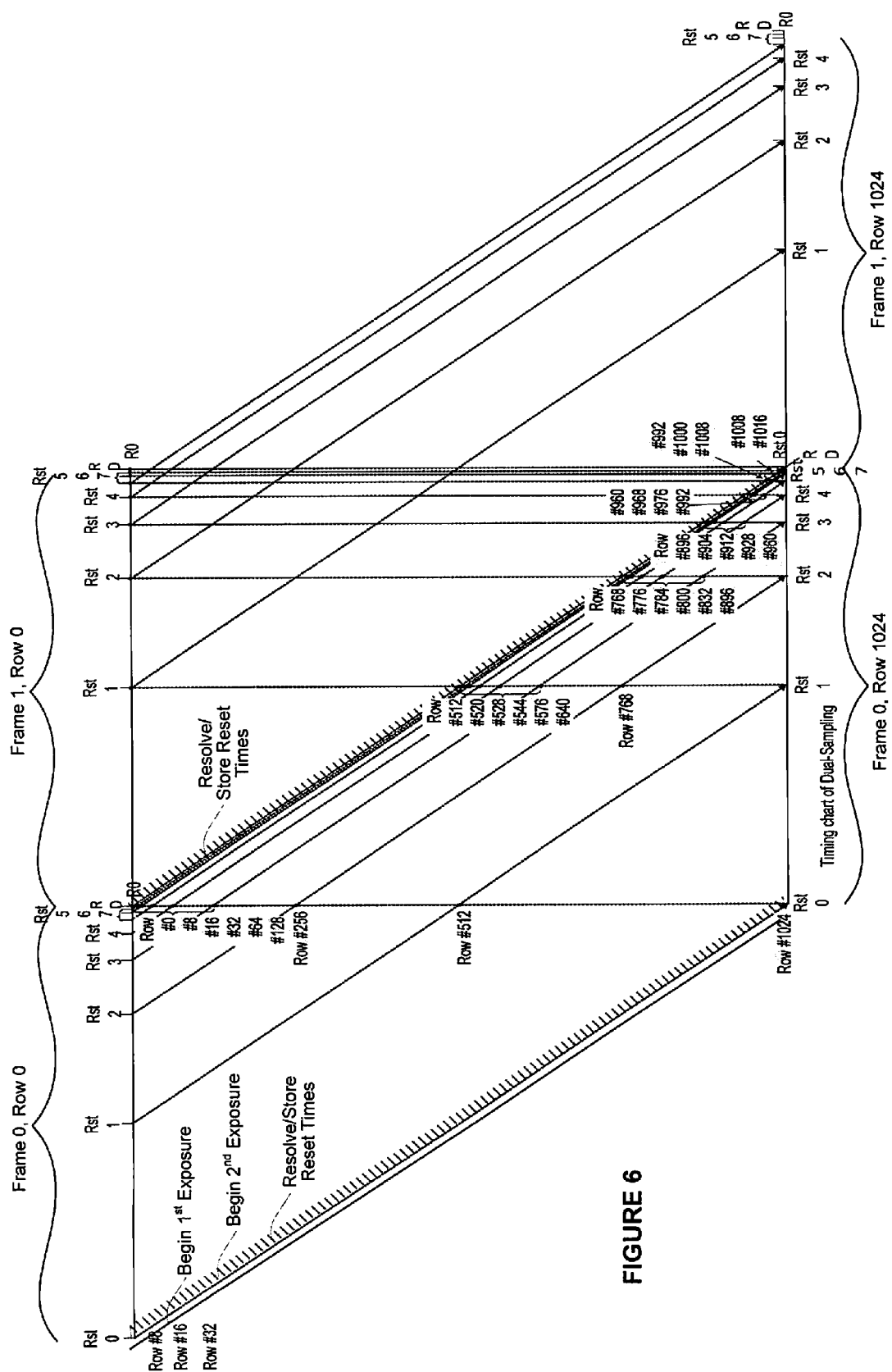
FIG. 6 illustrates a rolling shutter schedule for two adjacent captured frames and a seven-reset-per-frame capture sequence.

FIG. 6 illustrates a rolling shutter schedule for two adjacent frames of a video sequence. Time increases to the right, row number increases toward the bottom. Thus the illustrated diagonal lines correspond to the rolling reset and read times for each row.

As is apparent for this particular schedule that spreads the row read times evenly across an entire frame, each of the seven reset operations for a particular frame overlaps with other reset operations. The vertical lines illustrate, for several example times, rows that require row reset signals at substantially the same time. The actual reset schedule is adjusted, e.g., as shown in Table 2 above, to slightly shift reset times to avoid conflicts on the column transfer gate control signal lines.

To the extreme left of FIG. 6, the first diagonal line shows the rolling reset that begins the first exposure time for frame 0. The next diagonal line ("Rst 0") marks the end of the first exposure for each row. At this time, the first exposure values are read for each row, which operation also effectively begins the first (full-integration time) reset for the second exposure of frame 0. In the crosshatched region following the Rst 0 line, the first exposures are examined as they become available, and the desired reset times are selected for each pixel. The reset time schedules are then saved for eventual recall later in the frame.

The diagonal line appearing next in time is the Rst 1 line. As this time approaches for each row, reset schedule data is retrieved for that row and used to set the column transfer gate control signals that will either mask or not mask the Rst 1 row signal at each pixel in the row. A similar operation occurs for each row and the Rst 2-Rst 7 reset times. Finally, the frame 0 read time ("RD") arrives for each row in sequence, and the raw frame 0 pixel values are read from the array.

In the illustrated video mode, the "$1^{st}$ exposure" is not repeated for frame 1. Instead, as each second exposure value from frame 0 is processed to scale the raw value according to its integration time, the achieved exposure values are evaluated for the range achieved. As an example, if the raw values are in a 10-bit format and range from 0 to 1023, each raw value can be compared to a desired range, e.g., 256 to 768. If the raw value falls above this range, it is in danger of (or may have) saturated. If the raw value falls below this range, the exposure can be increased one stop without saturating the pixel. Thus the crosshatched area at the beginning of frame 1 for resolving and storing reset times is used to decide, for frame 1, whether to keep the reset schedule from frame 0, increase the exposure by one stop (if possible), or decrease the exposure by one stop (if possible). The appropriate reset values are written (or possibly kept if unchanged) into the schedule memory for that row. In the foregoing description and in the accompanying drawings, specific terminology and drawing symbols are set forth to provide a thorough understanding of the concepts described herein. In some instances, the terminology and symbols may imply specific details that are acceptable, but not necessary. For example, circuits described or depicted as including metal oxide semiconductor (MOS) transistors may alternatively be implemented using bipolar technology or any other technology in which a signal-controlled current flow may be achieved.

Figure 7:
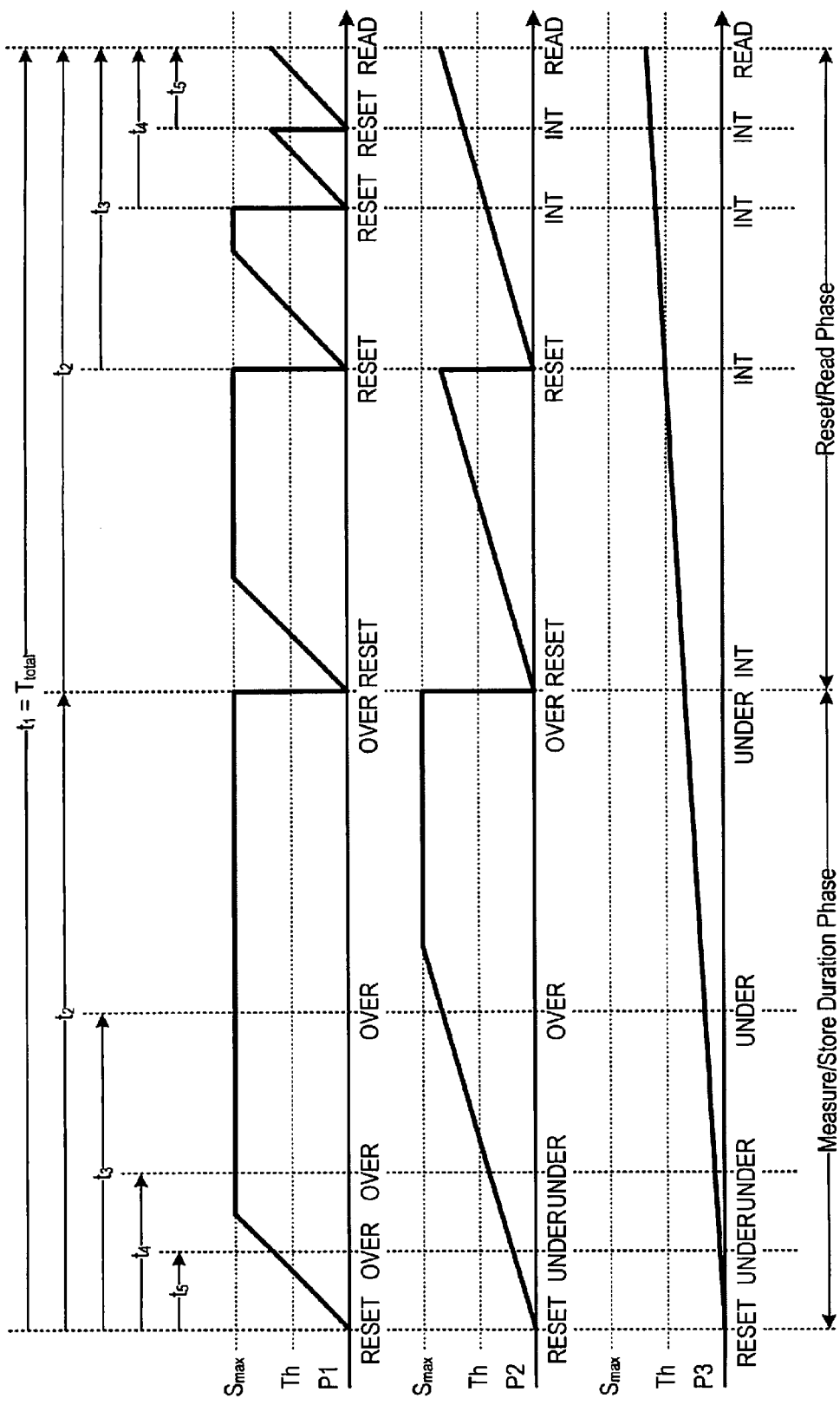
FIG. 7 illustrates, for three different illumination intensities, another embodiment that performs single threshold comparisons, but at multiple times.

FIG. 7 plots, for three hypothetical pixels under different illumination intensities, an accumulation of photocharge as a function of time. The FIG. 7 embodiment determines a second exposure time using temporally-spaced single-bit comparisons of exposure, instead of a single exposure, ADC readout, and comparison ranges, as in a previous embodiment. In dimmer light, the FIG. 7 embodiment may perform better at determining an optimum exposure because it integrates for longer periods before setting a long exposure. It is also noted that the FIG. 7 embodiment assumes that the act of performing one of the single-bit comparisons does not reset the pixel. Alternately, the comparison may reset the pixel in the case that an over-threshold condition evaluates true.

According to the embodiment illustrated at FIG. 7, an overall exposure time, $T_{total}$, is divided into a measure/store duration phase, where exposure durations are estimated and stored for each pixel, and a reset/read phase, where the exposure durations are used to control resets, e.g., as in the prior embodiments, to control exposure time. This example contains five possible overlapped exposure intervals, $t_1$-$t_5$, where $t_1$ spans the entire exposure time and both phases, and each succeeding interval starts halfway through the immediately prior interval. Other embodiments can have more or less exposure intervals, and need not space them at one-photographic stop intervals.

Operation of the sensor is illustrated for three pixels: P1, P2, and P3, operated in parallel, each with a different intensity that produces a different sensor control response. At the beginning of $t_1$, all three pixels are unconditionally reset. The sensor integrates photocharge for a time interval $t_5$. Column-wise comparators compare the pixel output voltages (in one embodiment) to a threshold, e.g., around 40% to 50% of the saturation voltage $S_{max}$ for the illustrated power-of-two stepped exposure sequence. For a given exposure sequence, the threshold selection(s) preferably provide reliable sensor dynamic range coverage without any gaps that cause low signal-to-noise response regions. The comparison produces an over/under result—in this case, P1 evaluates over, and P2 and P3 evaluate under. The sensor then integrates additional photocharge until a total time interval $t_4$ has elapsed since the frame beginning. The column-wise comparators again compare the pixel output voltages to a threshold (the same as before or different, depending on implementation), and the over/under results are the same as the first evaluation. This process repeats twice more, after frame elapsed times of $t_3$ and $t_2$, respectively: at $t_3$, both P1 and P2 evaluate over, and P3 evaluates under; at $t_2$, the same results occur.

After the fourth measurement, the measure and store duration phase ends and the reset/read phase begins. In this embodiment, the $t_2$ comparison results are immediately used to conditionally reset their respective pixels. Since both P1 and P2 were over threshold, those pixels are both reset. Since P3 was under threshold, P3 is not reset.

The pixels continue to integrate photocharge until a time interval $t_3$ from the end of the frame. At this time, the results of the $t_3$ comparison made in the Measure Phase (over, over, under) are recalled and used to reset P1 and P2 again (but not P3).

The pixels then continue to integrate photocharge until a time interval $t_2$ from the end of the frame. At this time, the results of the $t_2$ comparison made in the Measure Phase (over, under, under) are recalled and used to reset only P1.

The pixels then continue to integrate photocharge until a time interval $t_1$ from the end of the frame. At this time, the results of the $t_1$ comparison made in the Measure Phase (over, under, under) are recalled and used to reset only P1 again.

The pixels are all read out at the end of $T_{total}$. As a result of the reset operations, each pixel is read after respectively integrating for the longest of the five intervals that does not saturate the pixel.

Figure 8:
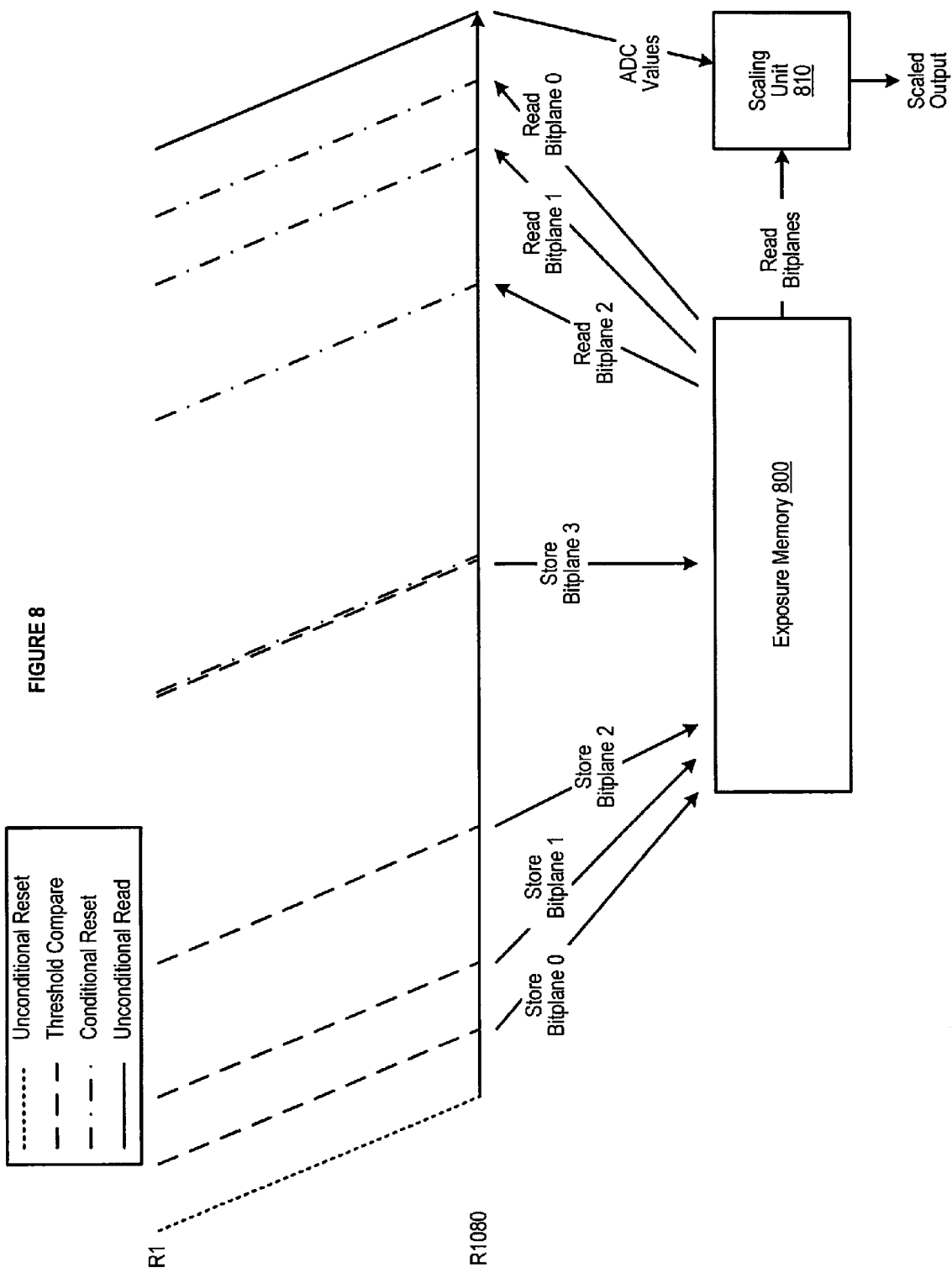
FIG. 8 illustrates, for the FIG. 7 embodiment, a rolling shutter schedule for acquisition of a frame.

FIG. 8 illustrates a rolling shutter sequencing diagram for a 1080-row sensor, with the timing of each row corresponding to the FIG. 7 timing and offset in time from the row above. The first comparison pass generates a first bitplane 0, one bit per pixel, e.g., generating a logic 0 for under threshold and a logic 1 for over. As each row is evaluated, the threshold bits for that row are stored to a corresponding location in an exposure memory 800.

The second comparison pass generates a second bitplane 1, like the first bitplane 0, and the rows are stored to other corresponding locations in exposure memory 800. Note that in this example, the upper bitplane 1 rows are evaluated and stored before the lower bitplane 0 rows, and the timing must account for this to avoid collisions (alternately, memory read/write queues and read pre-fetch techniques may be employed to avoid memory access collisions). Depending on the rolling rate and length of the exposure, more or fewer overlaps in passes may occur (see FIG. 6 for an extreme example of overlap on the reset phase).

The third and fourth comparison passes generate two more bitplanes (bitplanes 2 and 3) for storage in exposure memory 800. In this embodiment, bitplane 3 is immediately used to conditionally reset a given row as the comparison results of that row are formed. Immediate usage avoids a separate read of bitplane 3 back out of exposure memory 800.

As the reset/read phase continues, bitplanes 2, 1, and 0 are read from exposure memory 800 respectively for each row at the appropriate times to perform conditional reset for those rows.

At the end of the frame, each row is read and supplied to ADC converters in turn. The ADC values are merged with bitplane information from exposure memory 800 in a scaling unit 810. Generally, each exposure value is scaled by multiplying it by a value $(t_1/t_{best})$, where $t_{best}$ is the integration interval associated with the last reset of a pixel. In one embodiment for the special case of power-of-two exposure stepping, scaling unit 810 forms a scaled output by shifting an ADC value according to the corresponding bitplane information: a 4-bit shift (multiply by 16) if the bitplane 0 value is set; otherwise, a 3-bit shift if the bitplane 1 value is set; otherwise, a 2-bit shift if the bitplane 2 value is set; otherwise, a 1-bit shift if the bitplane 3 value is set; otherwise, no shift.

In another embodiment, scaling unit 810 prepends an exponent to each ADC value prior to transmission. The exponent value is 100 if the bitplane 0 value is set; otherwise, the exponent value is 011 if the bitplane 1 value is set; otherwise, the exponent value is 010 if the bitplane 2 value is set; otherwise, the exponent value is 001 if the bitplane 3 value is set; otherwise, the exponent value is 000. In the special case of power-of-two exposure stepping, the exponent value is a true base-2 exponent; for other temporal sequences, the exponent may serve as a pointer to a lookup table of scaling values, e.g., exposure multipliers of the form $t_1/t_n$.

In a variation on the embodiment of FIGS. 7 & 8, at the first time that a pixel evaluates above the threshold, an ADC conversion is read out for that pixel, in addition to the further readout scheduled for the end of the frame. The two readouts may be combined to produce an average readout for that pixel.

The methods performed in accordance with embodiments described herein can be implemented as, e.g., code in software, hardware, or a combination thereof. For example, when implemented in a computer-readable medium, the computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. In any event, the logic described above can be implemented in hardware, software, or a combination thereof.

While specific embodiments have been described, certain variations flow from those specific embodiments. For example, without being limiting, concepts described herein may be implemented in a computer system, camera system, scanner, machine vision, vehicle navigation, video phone, surveillance system, auto focus system, star tracker system, motion detection system, image stabilization system, and other image sensing and/or processing systems.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description.

The invention claimed is:

1. A method for operating an image sensor, said method comprising:
exposing each of a plurality of pixels in said image sensor for a respective first exposure time;
measuring a respective response of each of said plurality of pixels to said respective first exposure time; and
exposing each of said plurality of pixels for a respective second exposure time that depends for each pixel on said respective measured response of each of said plurality of pixels, wherein, for a group of pixels including a first pixel and second pixel read using a common row read signal, the respective second exposure times for the first pixel and the second pixel start at different times and end at a common time, and wherein the exposing comprises, for a sub-plurality of pixels sharing a common row reset signal:
asserting the common row reset signal a plurality of times during an exposure period; and
for each of the pixels in the sub-plurality, preventing the common row reset signal from causing a reset at any of the plurality of times that occur closer to the end of the exposure period than the respective second exposure time.

2. The method of claim 1 further comprising:
comparing said respective measured response of each of said plurality of pixels to at least one threshold value; and
determining said respective second exposure time for each of said plurality of pixels based on said comparing.

3. The method of claim 2, wherein for a given pixel, said respective second exposure time is for a current frame and said respective first exposure time comprises an exposure from a previous frame, and wherein determining said respective second exposure time comprises determining whether to decrease, increase, or maintain an exposure time used for the previous frame.

4. The method of claim 1 further comprising:
encoding each of said respective measured responses of each of said plurality of pixels as a digital word.

5. The method of claim 4 further comprising:
saving each of the bits of the digital word in a corresponding bitplane, each bitplane corresponding to a sensor reset time.

6. The method of claim 1, wherein preventing the common row reset signal from causing a reset comprises setting a column signal to disable a reset operation.

7. The method of claim 1, wherein the plurality of times are spaced substantially exponentially.

8. The method of claim 7, wherein at least one of the substantially exponentially spacings are each adjusted in length from an exact exponential spacing by a corresponding fraction of a minimum exposure time.

9. The method of claim 8, wherein the fraction of the minimum exposure time is selected such that shorter spacings are adjusted by a smaller fraction of the minimum exposure time than longer spacings.

10. The method of claim 1, wherein exposing each of a plurality of pixels in said image sensor for a respective first exposure time comprises:

at a plurality of intervals after the beginning of said respective first exposure time for a given one of the pixels, comparing an output signal of the given pixel to a threshold to produce a corresponding plurality of comparison results;

for each of the comparison results that indicates that the given pixel has passed the corresponding threshold, using that comparison result to reset the given pixel at a time interval before the end of said respective second exposure time; and when none of the comparison results indicate that the given pixel has passed the corresponding threshold, including the first exposure time in said respective second exposure time.

11. An image sensor, said sensor comprising:

logic to expose each of a plurality of pixels in said image sensor for a respective first exposure time;

logic to measure a respective response of each of said plurality of pixels to said respective first exposure time; and logic to expose each of said plurality of pixels for a respective second exposure time that depends for each pixel on said respective measured response of each of said plurality of pixels, wherein, for a group of pixels including a first pixel and second pixel read using a common row read signal, the respective second exposure times for the first pixel and the second pixel start at different times and end at a common time, and wherein the logic to expose comprises logic that, for a sub-plurality of pixels sharing a common row reset signal:

asserts the common row reset signal a plurality of times during an exposure period; and for each of the pixels in the sub-plurality, prevent the common row reset signal from causing a reset at any of the plurality of times that occur closer to the end of the exposure period than the respective second exposure time.

12. The image sensor of claim 11 further comprising:

logic to compare said respective measured response of each of said plurality of pixels to at least one threshold value; and logic to determine said respective second exposure time for each of said plurality of pixels based on said comparing.

13. The image sensor of claim 12, wherein said logic to determine said respective second exposure time determines, for a given pixel, whether second exposure time is for a current frame and said respective first exposure time comprises an exposure from a previous frame, and wherein said logic to determine said respective second exposure time comprises logic to determine whether to decrease, increase, or maintain an exposure time used for the previous frame.

14. The image sensor of claim 11 further comprising:

logic to encode each of said respective measured responses of each of said plurality of pixels as a digital word.

15. The image sensor of claim 14 further comprising:

logic to save each of the bits of the digital word in a corresponding bitplane, each bitplane corresponding to a sensor reset time.

16. The image sensor of claim 11, wherein said logic to prevent the common row reset signal from causing a reset comprises logic to set a column signal to disable a reset operation.

17. The image sensor of claim 11, wherein the plurality of times are spaced substantially exponentially.

18. The image sensor of claim 17, wherein at least one of the substantially exponentially spacings are each adjusted in length from an exact exponential spacing by a corresponding fraction of a minimum exposure time.

19. The image sensor of claim 18, wherein the fraction of the minimum exposure time is selected such that shorter spacings are adjusted by a smaller fraction of the minimum exposure time than longer spacings.

20. The image sensor of claim 11, wherein the logic to expose each of the plurality of pixels for a respective first exposure time comprises logic to, at a plurality of intervals after the beginning of said respective first exposure time for a given one of the pixels, compare an output signal of the given pixel to a threshold to produce a corresponding plurality of comparison results.

21. A high dynamic range image sensor comprising:

a pixel array comprising a plurality of pixels, each pixel in said array comprising logic for receiving a plurality of row-enabled signals effective to reset said pixel and a plurality of column-enabled signals effective to mask at least one of said plurality of row-enabled signals; and exposure logic coupled to said pixel array, said exposure logic configured to:

expose each of said plurality of pixels in said pixel array for a respective first exposure time;

measure a response of each of said plurality of pixels to said first respective exposure time; and expose each of said plurality of pixels for a second respective exposure time that depends for each pixel on said respective measured response of each of said plurality of pixels, wherein for a first pixel and a second pixel in the pixel array that are read using a common row read signal, the respective second exposure times for the first pixel and the second pixel start at different times and end at a common time, wherein said exposure logic, for a sub-plurality of pixels sharing a common row reset signal, is further configured to:

assert the common row reset signal a plurality of times during an exposure period; and for each of the pixels in the sub-plurality, prevent the common row reset signal from causing a reset at any of the plurality of times that occur closer to an end of the exposure period than the respective second exposure time.

22. The high dynamic range image sensor of claim 21, wherein said exposure logic is further configured to:

encode each of said respective measured responses of each of said plurality of pixels as a digital word.

23. The high dynamic range image sensor of claim 22, wherein said exposure logic is further configured to:

expose each of said plurality of pixels for said respective second exposure time that is associated with said digital word.

24. The high dynamic range image sensor of claim 21, wherein said exposure logic is further configured to:

save each of the bits of the digital word in a corresponding bitplane, each bitplane corresponding to a sensor reset time.

25. A non-transitory computer-readable medium storing data structures describing circuitry corresponding to the image sensor of claim 11.

* * * * *